United States Patent [19]

Shedd et al.

[11] 4,428,142

[45] Jan. 31, 1984

[54] OUTRIGGER FISHING CLIP

[75] Inventors: William D. Shedd, Mission Viejo; Robert C. Eschbach, Newport Beach, both of Calif.

[73] Assignee: Axelson Fishing Tackle Mfg. Co. Inc., Irvine, Calif.

[21] Appl. No.: 299,713

[22] Filed: Sep. 8, 1981

[51] Int. Cl.³ .......................................... A01K 91/00
[52] U.S. Cl. ................................. 43/43.12; 43/42.04; 43/44.88; 43/43.1
[58] Field of Search ................. 43/43.1, 43.12, 42.04, 43/44.88; 24/132 WL, 132 R, 248 B, 201 TR, 242, 232 R; 294/83 R

[56] References Cited

U.S. PATENT DOCUMENTS

| Re. 25,650 | 10/1964 | Strumpf | 43/43.12 |
|---|---|---|---|
| 2,749,648 | 6/1956 | Schneider | 43/43.12 |
| 2,925,682 | 2/1960 | Kravitch | 43/43.12 |
| 2,958,973 | 11/1960 | Le May | 43/43.12 |
| 3,015,513 | 1/1962 | Ewing | 294/83 |
| 3,077,048 | 2/1963 | Strumpf | 43/43.12 |
| 3,081,575 | 3/1963 | Meisner | 43/43.12 |
| 3,629,908 | 12/1971 | Phillips | 24/115 F |
| 3,905,148 | 9/1975 | Naone et al. | 43/43.12 |
| 3,919,801 | 11/1975 | Bart | 43/43.12 |
| 3,930,330 | 1/1976 | Black | 43/17 |
| 3,959,913 | 6/1976 | Weber | 43/43.12 |
| 3,961,437 | 6/1976 | Lewis | 43/43.12 |
| 4,069,611 | 1/1978 | Dusich et al. | 43/43.12 |
| 4,173,091 | 11/1979 | Emory, Jr. | 43/43.12 |

Primary Examiner—Nicholas P. Godici
Assistant Examiner—Kurt Rowan
Attorney, Agent, or Firm—Gausewitz, Carr, Rothenberg & Edwards

[57] ABSTRACT

An outrigger fishing clip comprises a U-shaped arm pivoted to a body to define a cavity between the arm and body in which is positioned one side of a roller journaled in the arm so that a fishing line extending through the clip between the arm and body rides friction-free over the roller. A latch member spans the arm and body having a cam element engaging the free end of the pivoted arm and resiliently pressed against the body to provide a predetermined adjustable force that resists pivotal release of the arm and of the tensioned fishing line entrained over its roller.

12 Claims, 5 Drawing Figures

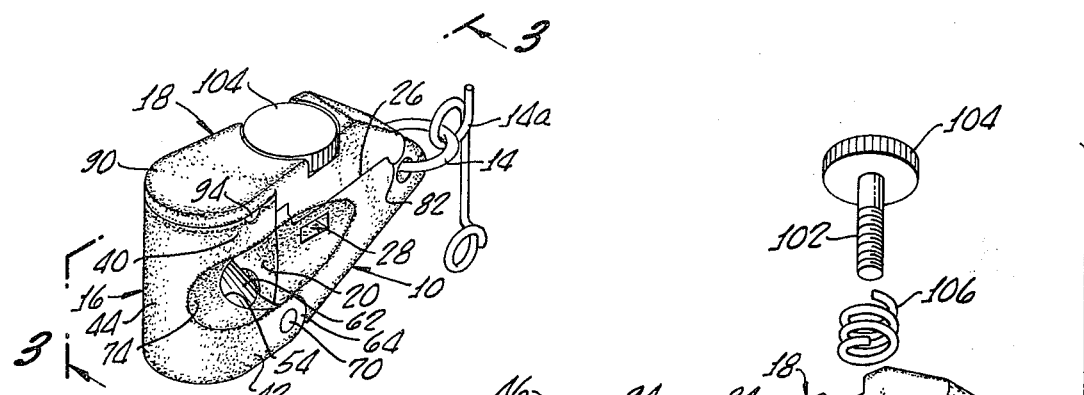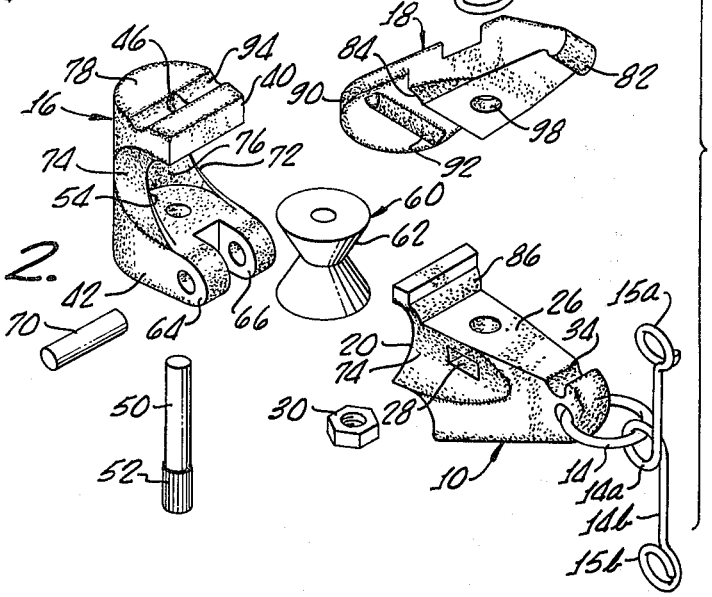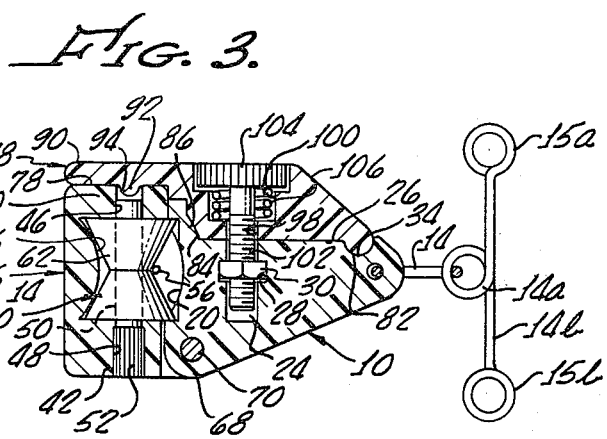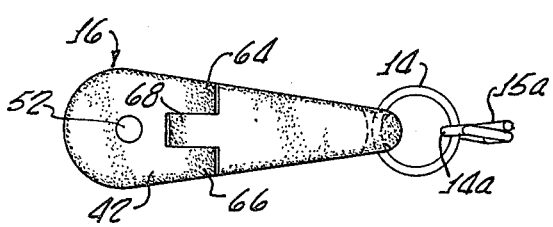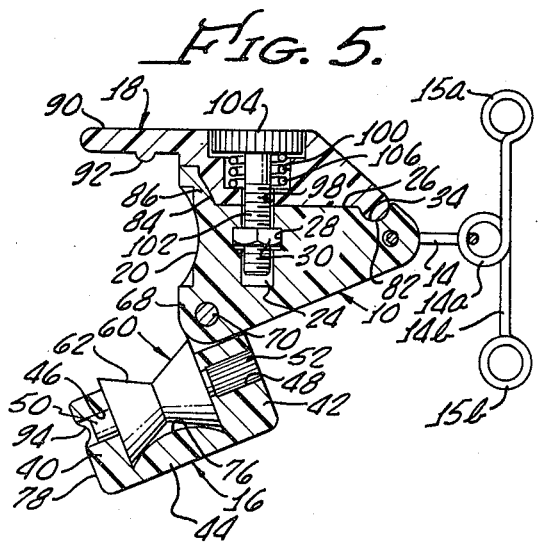

OUTRIGGER FISHING CLIP

BACKGROUND OF THE INVENTION

The present invention relates to releasable fishing line clips and more particularly concerns an improved outrigger clip of improved compact arrangement, increased efficiency, and decreased line friction.

In various types of trolling the fishing line is held at a position to one side of, or below, a cruising boat by means of an outrigger or downrigger. The line is releasably held at the outwardly or downwardly displaced position by being passed through a clip that is secured to a support, such as an outrigger pole or a weighted downwardly extending line. The clip is arranged so that when a fish strikes the bait or lure the fishing line tension is increased sufficiently to free the line from the clip.

As the clip is displaced from the cruising boat, the fishing line passing through the clip makes a sharp bend, generally being led over a releasable member, such as a wire or bail, that is pivoted to the clip and pulled outwardly by a sudden tension increase so as to allow the line to run freely out of the clip. Many releasable clips presently available create excessive friction between the fishing line and the wire or bail over which it runs so that the line frequently is seriously damaged or frayed.

An attempt to decrease this friction is found in the patent to Naone et al U.S. Pat. No. 3,905,148, which employs a circular sheave with fixed axial protruberances. These protruberances are frictionally received and clamped between a pair of legs that are adjusted to maintain the sheave in position. In this arrangement, the clamping force needed to hold the sheave in position exerts a rotation restraining frictional force on the sheave which thus may experience difficulties in turning and the concomitant loss of its friction-free characteristic. Further, with the arrangement of Naone et al the increased tension on a line to release the line from the clip will pull the sheave completely free of its supporting legs as the line is released. Thus, the sheave is lost each time there is a strike, and a new sheave must be employed for reuse of the clip. Obviously, economic considerations will prevent this disposable and expendable sheave from being manufactured with optimum charateristics of efficiency, durablilty, and frictionless rotation.

Accordingly, it is an object of the present invention to provide a releasable fishing clip that avoids or minimizes above-mentioned problems.

SUMMARY OF THE INVENTION

In carrying out principles of the present invention in accordance with a preferred embodiment thereof, a releasable roller clip comprises a clip body adapted to be secured to a support, such as an outrigger or downrigger, a releasable arm pivoted to the body for motion between a first position in which a portion of the arm adjacent the body is spaced from the body to define a line-receiving cavity closed at opposite ends of the arm, and a second position in which one end of the arm is away from the body. A roller is journaled to the arm and has a surface in the cavity spaced from the body whereby a force exerted by a tensioned line extending over the roller through the cavity tends to pivot the arm away from the body. Adjustable means are provided for retaining the arm in its first position.

BRIEF DESCRIPTION OF THE DRAWINGS

FIG. 1 is a perspective of an embodiment of the releasable roller clip in embodying principles of the present invention;

FIG. 2 is an exploded pictorial view of the parts of the clip of FIG. 1;

FIG. 3 is a cross section of the clip of FIG. 1 taken on lines 3—3 of FIG. 1;

FIG. 4 is a view of the bottom of the clip; and

FIG. 5 is a longitudinal sectional view of the clip in open position.

DETAILED DESCRIPTION OF THE PREFERRED EMBODIMENT

A presently preferred embodiment of the invention is disclosed in the drawings and comprises a clip body 10 secured to a suitable support, such as an outrigger or downrigger (not shown), generally indicated at 12, by means of a ring 14. Ring 14 freely engages an intermediate loop 14a fixed to a rod 14b having rings 15a, 15b through which an outrigger line (not shown) may be threaded. Thus, the body 10 is freely pivotable relative to the outrigger about two different axes. A pivoted arm 16 is releasably held to the body by a latch member 18 that spans the body and one end of the arm. The body 10 is of generally triangular configuration tapering rearwardly to a smaller end to which retaining ring 14 is secured. The body tapers from a curved forward surface 20 rearwardly in both horizontal and vertical dimensions. A blind bore 24 extends into the body from its upper surface 26 and extends through an enlarged recess 28 which receives a captured nut 30.

Body 10, like arm 16 and latch member 18, may be formed of a suitable hard, rigid, and corrosion-proof injection moled plastic. Recess 28 is formed so as to extend to one of the side surfaces of the body to enable insertion of the nut after forming the body.

At a rear portion of the upper surface of the body is formed a transverse depression 34 of semicircular cross section.

Arm 16 is formed in substantially a U-shape, having legs 40 and 42 interconnected by a bight 44. Legs 40 and 42 are formed with coaxial bores 46, 48 which receive opposite ends of a shaft 50 of which one end is a press fit in one of the bores so as to fixedly hold the shaft in position. Conveniently, the shaft end 52 is enlarged and is provided with a fine, narrow knurl or series of splines to more rigidly fix the shaft within the arm.

Inner surface 54 of the arm bight is convex and defines with the curved forward surface 20 of body 10 a cavity or passage 56. Journaled on shaft 52 is an elongated roller 60 having a shallow V-shaped surface 62, one side of which lies within the cavity 56 and is slightly spaced from the forward curved surface 20 of the body to receive a fishing line entrained thereover.

Lower leg 42 of the pivot arm 16 is bifurcated to provide ears 64, 66 that straddle a lower forward tongue 68 integral with the body. A pivot pin 70 extends through the ears 64, 66 and tongue 68 to connect the arm to the body for pivotal motion from the closed operating position illustrated in FIGS. 1 and 3, wherein the roller surface is adjacent to, but slightly spaced from, the body, to the release position shown in FIG. 5, wherein the free end 40 of the arm is displaced from the body to completely open passage 56.

Arm 16 has opposite sides of its bight depressed inwardly to form concave surfaces 72, 74 to allow free passage of a fishing line entrained over the roller. To strengthen the arm, bight 44 is formed with a convex, rearwardly facing surface 76 which increases the cross section and, accordingly, the rigidity of the arm.

Spanning the body and arm, and resting against the upper surface 26 and end surface 78 of the free end of arm 16, is the latch member 18. The latch member, at its downward and rearward end, has a downwardly projecting, substantially semicircular rib 82 extending transversely across the latch member and received in the mating transverse groove 34 of body 10. Thus the latch member, in effect, is fulcrumed upon the body by the rib 82 and groove 34. The latch member is further positioned on the body by engagement of an upwardly and fowardly inclined surface 84 thereof with a similar surface formed on an upwardly and forwardly extending flange 86 of the body. A flat tongue 90, integral with the latch member, extends forwardly therefrom and rests upon the upper surface 78 of the free end 40 of the pivot arm. A semicircular transverse cam rib 92 projects downwardly from the lower surface of latch member tongue 90 and is received in a mating transverse recess 94 of the free arm end 40.

Extending through the latch member body is a bore 98 that communicates with an upwardly open recess 100 in the upper surface of the latch member. A screw 102 having an enlarged head 104 extends through the recess 100 into threaded engagement with nut 30 captured within the clip body. A spring 106 circumscribes the screw within the cavity or recess 100 beneath the screw head 104. The latter extends slightly outwardly on either side of the latch member and has a knurled outer surface to facilitate adjustment of the release force of the clip.

Pivot arm 16 is held in operative position, illustrated in FIGS. 1 and 3, with the roller surface 62 adjacent the forward face of the body, by the force of the cam rib 92 of the latch member entending downwardly into the cam groove 94 at the free end of the arm. Latch member 18 is resiliently urged against the body and against the free end of the arm by the adjustment screw 102 which may be turned down against the resistance of the spring to adjust the frictional interengaging force between cam rib 92 and cam recess 94. Accordingly, adjustment of the screw will change the amount of force required to pivot the arm and roller free of the latch member in order to open the line passage and release the line. Interengaging latch positioning elements 34, 82 and 84, 86 resist relative shifting of the latch and body. As the tension in the line increases and the arm pivots slightly outwardly away from the body, the latch member is cammed upwardly, pivoting slightly about the fulcrum formed by the interengagement of rib 82 with the body recess 34.

A fishing line extends through the passage between the arm and body, but is always entrained over the roller surface. The positioning and configuration of the parts are such as to maintain the fishing line free of all parts of the clip other than the roller, when under normal trolling tension. The roller and its shaft and also the headed screw are preferably made of stainless steel. The roller arrangement of the fixed roller shaft with the roller journaled on the shaft provides for optimum freedom of friction and optimum freedom of rotation of the roller. The release resisting force exerted by the latch member and the adjusting screw are in no way transmitted to the roller or its axle, since these forces are taken by the body and the arm, and thus the maximum tightening of the adjusting screw will in no way affect the freedom of rotation of the roller and will not affect the freedom of the line entrained thereover.

The foregoing detailed description is to be clearly understood as given by way of illustration and example only, the spirit and scope of this invention being limited solely by the appended claims.

What is claimed is:

1. A releasable roller clip comprising
   a clip body,
   means on the body for securing it to a support,
   a releasable arm pivoted to said body for motion between a first position in which a portion of said arm adjacent said body is spaced from the body to define a line receiving cavity closed at opposite ends of said arm, and a second position in which one end of said arm is away from said body,
   a roller journaled to said arm and having a surface in said cavity spaced from said body, whereby the force exerted by a tensioned line extending over said roller through said cavity tends to pivot said arm and roller away from said body,
   means for retaining said arm in said first position, said arm being generally U-shaped, having first and second legs interconnected by a bight, a shaft extending between said legs, said roller being journaled on said shaft, one of said legs extending past said cavity and being pivoted to said body about an axis perpendicular to said shaft.

2. The clip of claim 1 wherein the other of said legs has a transverse groove formed in its free end, said means for retaining said arm comprising a latch member resiliently pressed against said body and having an end portion overlying said free end of said other leg, and a rib formed on said latch member end portion and projecting into said groove to resist pivotal motion of said arm away from said body.

3. The clip of claim 1 wherein said legs have mutually aligned bores respectively receiving opposite ends of said shaft, one end of said shaft being a press fit in one of said bores.

4. A releasable roller clip comprising
   a clip body,
   means on the body for securing it to a support,
   a releasable arm pivoted to said body for motion between a first position in which a portion of said arm adjacent said body is spaced from the body to define a line receiving cavity closed at opposite ends of said arm, and a second position in which one end of said arm is away from said body,
   a roller journaled to said arm and having a surface in said cavity spaced from said body, whereby the force exerted by a tensioned line extending over said roller through said cavity tends to pivot said arm and roller away from said body,
   means for retaining said arm in said first position, and said body tapering rearwardly from a relatively large cross section adjacent said arm to a relatively smaller cross section remote from said arm, said means for retaining said arm comprising a latch member overlying both said arm and body and tapering rearwardly with said body, and a screw extending through said latch member into said body, said screw having an enlarged head extending outwardly of both sides of said latch member.

5. A releasable roller clip comprising
   a body, an elongated roller journaled to said body about a roller axis extending in a first direction, means for pivotally connecting said roller at one end thereof to said body for motion about a pivot axis angulated relative to said roller axis between a first position in which a roller surface is adjacent to but spaced from said body and a second position in which said roller is pivoted away from said body, means for resisting motion of said roller from said first position with a predetermined amount of resistive force, and means for connecting said body to a support, said means for pivotally connecting comprising an arm extending along said roller axis, said arm being generally U-shaped and having first and second legs interconnected by a bight, a shaft extending between said legs, said roller being journaled on said shaft, one of said legs being pivoted to said body about an axis perpendicular to said shaft.

6. The clip of claim 5 wherein said means for resisting motion comprises a latch member bridging said body and arm and having cam means releasably engaged with an end of said arm, and a screw extending parallel to said roller axis through said latch member into said body for holding said latch memeber against said body and holding said cam means in engagement with said arm end.

7. A releasable roller clip comprising
a clip body
means on the body for securing it to a support,
a releasable arm pivoted to said body for motion between a first position in which a portion of said arm adjacent said body is spaced from the body to define a line receiving cavity closed at opposite ends of said arm, and a second position in which one end of said arm is away from said body,
a roller journaled to said arm and having a surface in said cavity spaced from said body, whereby the force exerted by a tensioned line extending over said roller through said cavity tends to pivot said arm and roller away from said body, said arm being generally U-shaped, having first and second legs interconnected by a bight, said roller extending along said bight and being journaled between said legs, one of said legs being pivoted to said body about an axis perpendicular to said shaft, and
means for retaining said arm in said first position.

8. A releasable roller clip for holding a trolling fishing line with minimum friction comprising
a clip body,
means on the body for securing it to a support,
a releasable arm pivoted to said body for motion between a first position in which a portion of said arm adjacent said body is spaced from the body to define a line receiving cavity closed at opposite ends of said arm, and a second position in which one end of said arm is away from said body,
a roller journaled to said arm and having a surface in said cavity spaced from said body, whereby the force exerted by a tensioned line extending over said roller through said cavity tends to pivot said arm and roller away from said body, said arm having inwardly depressed portions that allow free passage of a fishing line entrained over said roller, and means for retaining said arm in said first position, said means for retaining comprising a latch member spanning said body and arm, means for urging said latch member toward said body with an adjustable force, and interengaging cam means on said latch member and arm for forcing said latch member away from said body to disengage said cam means in response to a force greater than a predetermined magnitude exerted by a tensioned line extending over said roller.

9. A releasable roller clip for holding a trolling fishing line with minimum friction comprising
a clip body,
means on the body for securing it to a support,
a releasable arm pivoted to said body for motion between a first position in which a portion of said arm adjacent said body is spaced from the body to define a line receiving cavity closed at opposite ends of said arm, and a second position in which one end of said arm is away from said body,
a roller journaled to said arm and having a surface in said cavity spaced from said body, said roller being journaled to said arm about a first axis, said arm being pivoted to said body about a second axis angulated relative to said first axis,
whereby the force exerted by a tensioned line extending over said roller through said cavity tends to pivot said arm and roller away from said body, said arm having inwardly depressed portions that allow free passage of a fishing line entrained over said roller, and
means for retaining said arm in said first position.

10. A releasable roller clip for holding a trolling fishing line with minimum friction comprising
a clip body,
means on the body for securing it to a support,
a releasable arm pivoted to said body for motion between a first position in which a portion of said arm adjacent said body is spaced from the body to define a line receiving cavity closed at opposite ends of said arm, and a second position in which one end of said arm is away from said body,
a roller journaled to said arm and having a surface in said cavity spaced from said body, whereby the force exerted by a tensioned line extending over said roller though said cavity tends to pivot said arm and roller away from said body, said arm having inwardly depressed portions that allow free passage of a fishing line entrained over said roller, and
means for retaining said arm in said first position, said means for retaining comprising a latch member positioned against said body, interengaging positioning means on said body and latch member for resisting relative shifting of said latch member and body, interengaging cam means on said arm and latch member for resisting movement of said arm from said first position, and adjustable means for pressing said latch member toward said body to control resistance of said cam means to movement of said arm.

11. A releasable fishing clip for freely holding a fishing line under trolling tension with a minimum of friction and abrasion comprising
a body,
an arm having ends positioned against said body and defining therewith a passage between the arm and body intermediate the ends of the arm, means for pivotally connecting the arm to said body for motion of one of said arm ends outwardly from said body so as to open one side of said passage, an elongated roller journaled in said arm and extending between the ends thereof, said roller having a surface in said passage adjacent to but spaced from said body when the arm is positioned against said body, said arm being shaped and positioned to cause a fishing line entrained over said roller to be maintained free of all parts of said clip other than the roller when under normal trolling tension, latch means on said body in engagement with said arm for exerting a predetermined force that resists motion of said one arm end away from said body, and means for connecting said body to a support, said means for connecting comprising a ring secured to said body, a rod having outrigger securing connectors at opposite ends thereof and having a loop connected to an intermediate portion thereof, said ring extending through said loop.

12. A releasable fishing clip for freely holding a fishing line under trolling tension with a minimum of friction and abrasion comprising a body, an arm having ends positioned against said body and defining therewith a passage between the arm and body intermediate the ends of the arm, means for pivotally connecting the arm to said body for motion of one of said arm ends outwardly from said body so as to open one side of said passage, an elongated roller journaled in said arm and extending between the ends thereof, said roller having a surface in said passage adjacent to but spaced from said body when the arm is positioned against said body, said arm being shaped and positioned to cause a fishing line entrained over said roller to be maintained free of all parts of said clip other than the roller when under normal trolling tension, latch means on said body in engagement with said arm for exerting a predetermined force that resists motion of said one arm end away from said body, said latch means comprising a latch having one end fulcrumed on said body, cam means on the other end of said latch engaging said arm, and means for urging said latch toward said body with an adjustable force, whereby force of a predetermined magnitude exerted by a tensioned line extending over said roller and through said passage will disengage said cam means and pivot said arm and roller from said body, and means for connecting said body to a support.

* * * * *

UNITED STATES PATENT AND TRADEMARK OFFICE
CERTIFICATE OF CORRECTION

PATENT NO. : 4,428,142

DATED : January 31, 1984

INVENTOR(S) : William D. Shedd, Robert C. Eschbach

It is certified that error appears in the above-identified patent and that said Letters Patent are hereby corrected as shown below:

Column 2, line 19, cancel "generally indicated at 12"

Column 3, line 38, "entending" should read ---extending---.

Signed and Sealed this

Thirtieth Day of October 1984

[SEAL]

Attest:

GERALD J. MOSSINGHOFF

Attesting Officer     Commissioner of Patents and Trademarks